United States Patent [19]
Gilbert et al.

[11] Patent Number: 5,116,889
[45] Date of Patent: May 26, 1992

[54] PULPED PAPERBOARD-POLYMER COMPOSITIONS

[75] Inventors: Seymour G. Gilbert, 76 N. Ross Hall Blvd., Piscataway, N.J. 08854; Urban J. Coelho, Bedminster, N.J.

[73] Assignee: Seymour G. Gilbert, Pascataway, N.J.

[21] Appl. No.: 470,880

[22] Filed: Jan. 26, 1990

[51] Int. Cl.⁵ .................. C08L 1/00; D21H 17/53
[52] U.S. Cl. ............................ 524/14; 524/13; 524/35; 162/4; 162/13; 162/147; 162/168.1; 162/168.2; 162/189
[58] Field of Search ............ 162/4, 13, 147, 168.1, 162/168.2, 189; 524/13, 14, 35

[56] References Cited

U.S. PATENT DOCUMENTS

| | | | |
|---|---|---|---|
| 2,962,414 | 11/1960 | Arledter | 162/168.1 |
| 3,184,373 | 5/1965 | Arledter | 162/168.1 |
| 3,533,908 | 10/1970 | Hoogsteen | 162/168.2 |

FOREIGN PATENT DOCUMENTS 6127632  10/1981  Japan ............................ 524/35

Primary Examiner—Paul R. Michl
Assistant Examiner—Peter Szekely
Attorney, Agent, or Firm—Leroy G. Sinn

[57] ABSTRACT

This invention relates to homogeneous compositions comprising pulped paperboard and a finely divided polymer, suitably polyethylene terephthalate, commonly referred to as "PET". Also, provided are stable aqueous dispersions of finely divided polymer particles, preferably of micronic or submicronic range particle size. Processes for providing the novel compositions of the invention are also provided.

15 Claims, No Drawings

PULPED PAPERBOARD-POLYMER COMPOSITIONS

FIELD OF INVENTION

This invention relates to homogeneous compositions comprising pulped paperboard and a finely divided polymer, suitably polyethylene terephthalate, commonly referred to as "PET". Also, provided are stable aqueous dispersions of finely divided polymer particles, preferably of micronic or submicronic range particle size. Processes for providing the novel compositions of the invention are also provided.

BACKGROUND OF THE INVENTION

A large problem exists in disposing of a number of waste materials. One such material is scrap paperboard. Scrap paperboard is presently disposed of as by burning or by placing into landfills. Neither method is satisfactory.

Likewise, disposing of scrap polymer such as polyethylene terephthalate is a serious problem. Two present methods of disposal are by burning or by placing it into landfills. Polyethylene terephthalate provides the added problem of being highly resistant to degradation in landfills. A large amount of polyethylene terephthalate is used in making soft drink containers which often pollute the landscape and waterways.

Pulped paperboard has a low-tensile strength which only permits a limited use. It would be desirable to have pulped paperboard compositions which have greatly increased tensile strength. It would also be desirable to provide pulped paperboard compositions having increased tensile strength wherein a substantial component is a finely divided polymer material.

SUMMARY OF INVENTION

Compositions provided by this invention comprise homogeneous mixtures of pulped paperboard and finely divided polymer material, providing when dried to remove excess moisture present a tensile strength in ASTM Test Designation D638-89 of at least 150 percent of the pulped paperboard alone. The respective amount of the finely divided polymer component present in the composition can vary widely so long as the desired increase in tensile strength is obtained. Suitably the amount of finely divided polymer will be an effective amount in the range of about 20 parts to about 1000 parts by weight per 100 parts by weight of pulped paperboard present in the composition. Presently preferred compositions have about 40 parts to about 400 parts by weight of the finely divided polymer per 100 parts of the pulped paperboard present.

Desirably the compositions have a tensile strength of at least 150 percent that of pulped paperboard alone, desirably at least 200 percent that of paperboard alone, preferably at least 300 percent that of paperboard alone, and more preferably at least 500 percent that of pulped paperboard alone.

Desirable compositions have about 20 parts to about 1000 parts by weight, preferably about 40 parts to about 400 parts by weight, of the finely divided polymer material, and a tensile strength of at least 300 percent, preferably at least 500 percent of the pulped paperboard.

A presently preferred finely divided polymer material is polyethylene terephthalate.

It has been found desirably to incorporate into the compositions an effective amount of a tensile strength enhancing agent which is mutually acceptable to both the pulped paperboard and the finely divided polymer component.

It has been found that polyethyloxazoline is useful to incorporate into the compositions as a tensile strength enhancing agent. An effective amount can vary, such as from about 5 parts to about 75 parts per 100 parts of pulped paperboard present in the composition, desirably about 10 parts to about 50 parts per 100 parts of paperboard. The least effective amount desirably is used in view of the added cost of using a tensile strength enhancing agent. Other effective tensile strength enhancing agents can be used so long as they provide the desired tensile strength enhancement and are acceptable to both the pulped paperboard and the finely divided polymer components.

Also, provided by this invention is a process for providing the compositions of this invention. Desirably the process is carried out first by pulping paperboard, then adding to the pulped paperboard an effective amount of a tensile strength enhancing agent and homogeneously mixing said agent and the pulped paperboard, permitting the pulped paperboard-tensile strength enhancing agent mixture to stand to obtain desired tensile strength enhancing effect and then homogeneously adding to the pulped paperboard-tensile strength enhancing agent mixture, the desired amount of finely divided polymer. The moisture content is reduced as desired in the final resulting composition.

Also, provided by this invention is a stable aqueous dispersion of a finely divided polymer material, desirably in a viscous or paste-like consistency. Polyethylene terephthalate is a presently preferred polymer for use in making the stable aqueous dispersion of finely divided polymer.

DETAILED DESCRIPTION OF THE INVENTION AND THE PREFERRED EMBODIMENTS

The invention is illustratively carried out in the following manner. Ordinary paperboard can be cut into an appropriate size, such as 2 or 2½ inch square pieces. About a hundred parts by weight of such pieces of paperboard, along with about 2000 parts of water can be placed into a blender receptacle. The mixture is then blended for an appropriate time, for example, for 30 to 60 seconds. It has been found that about 45 seconds is suitable. The blending should be done at such a rate that will give a uniform pulp without unduly disintegrating the fibers of the paperboard.

The amount of water can be varied appropriately so that good blending and pulping action can be obtained. Unnecessary excess water should be avoided.

It has been found that commercially available blending devices can be used such as sold under the designation Waring Blender. Conventional pulping machines could be used for manufacturing.

If desired, an amount of tensile strength enhancing agent can be added to the pulped paperboard mixture. For example, an effective amount of a polyethyloxazoline such as sold under the designation Dow PEOX-50 can be used. It has been found that an amount of 5 to 75 parts of polyethyloxazoline can be added to the pulped paperboard. It has been found convenient to add the tensile strength enhancing agent by, in illustration, adding an amount such as 10 to 50 parts of polyethyloxazoline such as sold as Dow PEOX-50 to a suitable amount of water, for example, about 1500 to 2000 parts of water per hundred parts of paperboard used. If need be, the mixture of polyethyloxazoline can be stirred and heated slightly such as to 60° to cause the polyethyloxazoline to dissolve. Then, the polyethyloxazoline solution is added to the paperboard pulped mixture and homogeneously mixed therein by blending the mixture at an effective low rate for a short period of time such as 30 seconds or a minute.

The pulped mixture to which the tensile strength enhancing agent has been added in appropriately permitted to stand. It has been found that an appropriate time is ordinarily 30 to 60 minutes.

To the pulped mixture to which the tensile strength enhancing agent has been added, is added an amount of a finely divided polymer. Suitable amount will be selected to provide the desired mixture of paperboard and polymer. It has been found suitable in illustration to add 100 parts of finely divided polyethylene terephthalate. The amount used can be varied widely to obtain desired properties in the final composition. The amount used can depend at least in part on the polymer used, use intended, the particle size, other components employed and the like factors.

The finely divided polymer can be added as a powder to the blender. The powder is desirably added slowly in order to permit good blending. If required, the final blending can be done mechanically if the blender is not capable of completing the blending when a large increase in viscosity occurs during the addition. Preferably, a blender or mixer is selected which has capability to complete the blending not withstanding the increase in viscosity.

In making the mixture, it is desired to use a long fiber paperboard. This provides a most desired product. It has been found suitable to use a polymer powder that will pass through a 200 mesh screen. The pore size in the 200 mesh screen is 0.0029 inches or 0.074 millimeters, which is 74 microns. It is considered suitable that the particle size is desirably smaller than 100 microns and falls within the range of one to 100 microns or a more preferred range of one to about 80 microns. Also, on a predominant weight basis it is deemed that the particle size can be of a submicronic size such as 0.1 or 0.2 microns or larger.

Other finely divided polymer materials can be selected instead of polyethylene terephthalate. Other suitable materials can be selected from finely divided polymers of the following group: polyvinylchloride, polymethylmethacrylate, polyacrylic acid, polyethylene, polypropylene, polyacrylonitrile, polyvinyl acetate or the like finely divided polymeric materials which can be formed into the compositions of this invention to provide molded parts which have tensile strength of desired magnitude greater than that of the pulped paperboard itself.

The finely divided polymer material can be obtained directly from the polymer polymerization process, using either high quality or off-grade material. Also, the finely divided polymer can be obtained by using molded objects which require disposal, for example, soft drink bottles made of polyethylene phthalate. Such objects can be converted to the desired finely divided polymer material using methods known to those skilled in the art, such as grinding, pulverizing and the like.

If desired, certain water-soluble or water emulsifiable polymers can be added to the compositions. For example, one or more of such polymers can be selected for addition from polyvinylacetate, partially hydrolysed polyvinylacetate, polyvinylalcohol, polyethylene glycol, hydroxyethyl cellulose, emulsifiable polyethylene (partially oxidized polyethylene and the line). Various amounts and combinations can be used depending upon the desired properties and the composition used. In illustration, 1 to about 50 parts by weight, desirably 2 to about 30 parts by weight, per 100 parts by weight of pulped paperboard present in the composition can be incorporated and homogeneously mixed.

After the finely divided polymeric material is added to the pulped paperboard aqueous mixture, the excess moisture can be removed in conventional manner as by evaporation using driers or the like.

Other tensile strength enhancing agents can be used instead of polyethyloxazoline. For example, some or all of the side groups can be removed from the polyethyloxazoline molecule. If complete hydrolysis takes place, polyethyleneimine is provided. Other agents can be used as will be apparent to those skilled in the art. For example, certain metallic salts can provide the desired tensile strength enhancing agent activity, such as titanium tetrachloride and other metal salts.

In making the compositions it might be desired to add the finely divided powder to the pulped paperboard mixture by first forming a paste-like substance or material by blending water in an appropriate amount to the finely divided polymer material. For example, 100 parts of finely divided PET and a sufficient amount of water, such as 1000–2000 parts, can be combined in a blender and blended at desired speed until a highly viscous mixture or paste-like composition is obtained. This aqueous dispersion then can be added with blending to the pulped paperboard mixture.

If desired, a suitable amount of the tensile enhancing agent can be added to the aqueous dispersion of the finely divided polymer mixture prior to addition to the paperboard pulped mixture. For example, an amount equivalent to that added to the paperboard pulped mixture can also be added to the finely divided polymer dispersion. Ordinarily, a lesser amount can be used, for example, 5 to 25 parts of polyethyloxazoline can be added to the water used in making the aqueous dispersion of the finely divided polymer material.

Alternatively, all of the tensile strength enhancing agent can be added to the finely divided polymer material aqueous dispersion. However, ordinarily a more desired final composition with greater tensile strength is obtained if at least a portion, preferably at least about half, of the tensile strength enhancing agent is added as described above to the pulped paperboard prior to addition thereto of the finely divided polymer component.

The tensile strength is measured by following American Standards for Testing Materials procedure, designated as ASTM D638-89. Appropriately, a gauge length of 2.0 inches (50.8 millimeters) and a cross head speed of 20 millimeters per minute in a specimen with 0.5 inches (12.7 millimeters) are used.

An additional criterion is used to determine the desirability of the material obtained. This test is a determination of elongation of break. It has been found that appropriately the elongation of break should be preferably at least about 1.0 millimeter or at least in the range of 0.5 or greater.

The compositions of this invention have substantially increased resistance to water as compared to the pulped paperboard preferred compositions being essentially waterproof. Additionally, the compositions have substantially increased rot-resistance, preferred compositions having a high degree of rot-resistance property.

To the composition can be added certain other materials known to those having skill in the art. Such materials include strength enhancing agents such as glass fibers, graphite, and the like. Also there can be added one or more of the following agents: certain stabilizers, anti-oxidant agents, compatible pigments, surfactants, dispersing agents, plasticizing agents and the like.

It will be appreciated that at times it will be desirable to add combinations of finely divided polymeric agents using two or more different polymeric materials.

The following examples are illustrative of the invention and are not meant to be limiting.

EXAMPLE 1

The following general procedure is used in making the compositions. Common paperboard or cardboard is cut into pieces of approximately 2½ inches square. About 100 parts of paperboard and 2000 parts of water are added to a blender jar at ambient room temperature. The blender is set on low setting and the blending is carried out for 45 seconds. An amount of polyethyloxazoline is added as indicated in the table below, which is 33 to 67 parts per 100 parts of paperboard used.

The polyethyloxazoline which is designated Dow PEOX-50 is placed into a beaker and the amount of water being (100 times 200 divided by 15). The mixture of polyethyloxazoline and water is heated to 60° C. and stirred using a magnetic stirrer, until a solution is formed. The polyethyloxazoline solution is then added to the pulped paperboard mixture and the mixture is blended for 30 seconds, using a low setting on the blender. The blended mixture is permitted to stand for 30 minutes.

To the mixture of pulped paperboard plus tensile strength enhancing agent is added 200 parts of finely divided PET powder, which passes through a 200 mesh screen, the pore size belong of 0.0029 inches of 74 microns. The mixture is blended after each addition of PET until a homogeneous mixture is obtained.

The blended mixture is added to a female cavity of the mold and the excess moisture of the mixture is removed to reduce the moisture content to about 15 percent moisture level. The moisture is removed by either using a hot air blower or elevating the oven to 90° C. It takes approximately four hours to remove the excess moisture.

The male plug of the molding assembly is placed on top of the partially dried mixture. The mold assembly then is placed on the lower platen of a Carver Press. The upper and lower platens on the Carver Press are heated to 110° C. and 250 kg of load is applied for a period of 3 hours. The molded plaque is removed and evaluated for tensile strength.

The following mixtures were made. It will be noted that the number 1 composition is simply paperboard pulp itself. Also the number 10 composition is simply a polyethylene terephthalate sample taken from a molded carbonated soft drink bottle. It is to be noted that in each mixture the polyethyloxazoline was added to the pulped paperboard with the exception of example 9, in which the polyethyloxazoline was added to an aqueous dispersion of polyethylene terephthalate, which was then added to the paperboard pulped mixture.

TABLE

TENSILE STRENGTH OF PET-PAPERBOARD COMPOSITIONS

| Sample (pts by wt) | Tensile Strength (psi) | Elongation at Break (mm) |
|---|---|---|
| 1. Paperboard | 493 ± 15 | 2.3 |
| 2. 100 Paperboard 200 PET | 762 ± 167 | 1.0 |
| 3. 100 Paperboard 150 PET | 950 ± 60 | 1.0 |
| 4. 100 Paperboard 300 PET 50 PEOX 50 | 1905 ± 203 | 0.8 |
| 5. 100 Paperboard 200 PET 67 PEOX 50 | 1895 ± 178 | 1.0 |
| 6. 100 Paperboard 200 PET 67 PEOX 200 | 1555 ± 254 | 0.8 |
| 7. 100 Paperboard 150 PET 50 PEOX 50 | 3068 ± 254 | 1.0 |
| 8. 100 Paperboard 100 PET 33 PEOX 50 | 3145 ± 229 | 1.0 |
| 9. 100 Paperboard 100 PET 33 PEOX 50 | 1138 ± 183 | 0.6 |
| 10. PET | 21692 ± 660 | At Yield 3.4 |

The data of the TABLE show that Composition 6 has about 100 percent improvement in tensile strength over the tensile strength of control Composition 2:

100 (1555 psi − 762 psi)/752 psi = 100 (793 psi)/762 psi = 104 percent;

and that Composition 7 has about 220 percent improvement in tensile strength over the tensile strength of control Composition 3:

100 (2068 psi − 950 psi)/950 psi = 100 (2118 psi)/950 psi = 223 percent

Example 2

The above procedure is repeated to form other compositions of this invention using the other finely divided polymers and combinations referred to above as well as the other tensile strength enhancers referred to above.

What is claimed is:

1. A homogeneous composition of a combination of pulped waste paperboard and a finely divided polymer, said combination having incorporated an effective amount of a tensile strength enhancer selected from the group consisting of polyethyloxazoline, hydrolysis derivatives thereof, including polyethylene imine, and titanium salts, and having at least about 100 percent of the improvement in tensile strength over the corresponding control combination of the pulped paperboard and the finely divided polymer, said improvement in tensile strength as determined by ASTM Test Designation D638-89.

2. A composition of claim 1 wherein the finely divided polymer is polyethylene phthalate.

3. A composition of claim 1 wherein the tensile strength improvement is at least about 220 percent.

4. A composition of claim wherein the tensile strength improvement is at least about 220 percent.

5. A composition of claim 1, 2, 3 or 4 wherein the tensile strength enhancer is polyethyloxazoline.

6. A composition of claim 1 or 2 wherein the polyethyloxazoline is present in an effective amount in the range of from about 5 parts to about 75 parts per 100 parts of pulped paperboard in the composition.

7. A composition of claim 1 or 2 wherein the polyethyloxazoline is present in an effective amount in the range of from about 10 to about 50 parts per 100 parts of the paperboard present in the composition.

8. A composition of claim 1 or 2 wherein the tensile strength enhancer is partially or completely hydrolysed polyethyloxazoline.

9. A composition of claim 1 or 2 which is substantially waterproof or rot proof or both.

10. A composition of claim 1 or 2 wherein the finely divided polymer is present in an amount in the range of from about 20 to about 1000 parts per 100 parts of pulped paperboard present in the composition.

11. A composition of claim 1 or 2 wherein the finely divided polymer is present in an amount in the range of from about 40 parts to about 400 parts per 100 parts of the pulped paperboard present in the composition.

12. A composition of claim 1 or 2 wherein the predominant portion on a weight basis of the finely divided polymer has a particle size smaller than about 100 microns.

13. A composition of claim 1 or 2 wherein said particle size is submicronic.

14. A process for enhancing the tensile strength of a composition comprising a pulped paperboard and a finely divided polymer as determined by ASTM Test Designation D638-89, comprising the following steps:
  1) forming a pulped paperboard from paperboard;
  2) adding to said pulped paperboard an effective amount of a tensile strength enhancing agent selected from the group consisting of polyethyloxazoline, hydrolysis derivatives thereof, including polyethylene imine, and titanium salts and homogeneously mixing said combination;
  3) adding an effective amount of a finely divided polymer to said homogeneous combination of pulped paperboard and tensile strength enhancer and mixing to form a homogeneous mixture; and
  4) removing the water of said composition as desired.

15. A process of claim 14 wherein the finely divided polymer is finely divided polyethylene terephthalate.

* * * * *